Nov. 30, 1943.　　　　A. R. THOMPSON　　　　2,335,618
CAN HANDLING APPARATUS
Filed April 6, 1940　　　　5 Sheets-Sheet 1
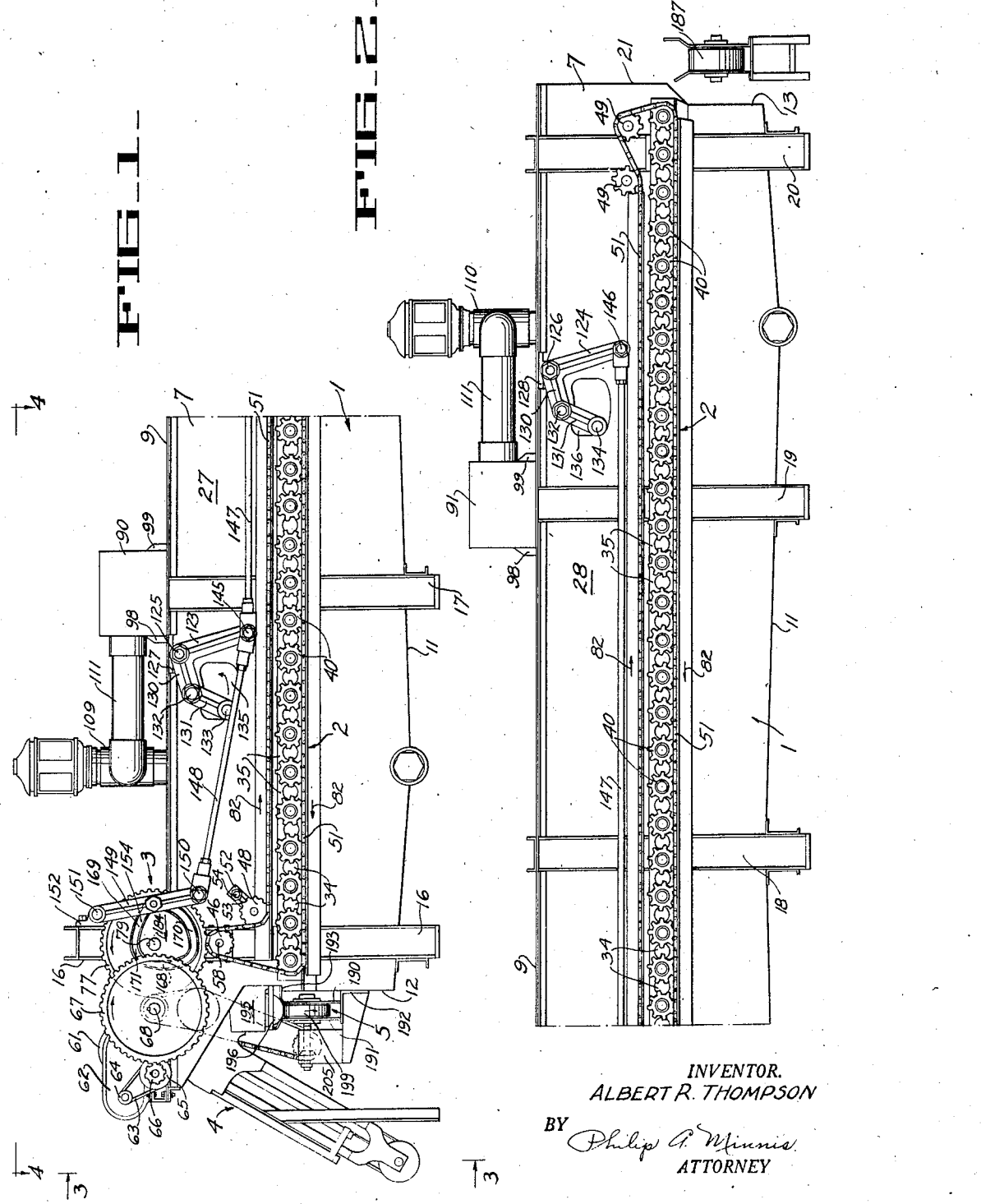
INVENTOR.
ALBERT R. THOMPSON
BY Philip G. Minnis
ATTORNEY Nov. 30, 1943.    A. R. THOMPSON    2,335,618
CAN HANDLING APPARATUS
Filed April 6, 1940    5 Sheets-Sheet 2
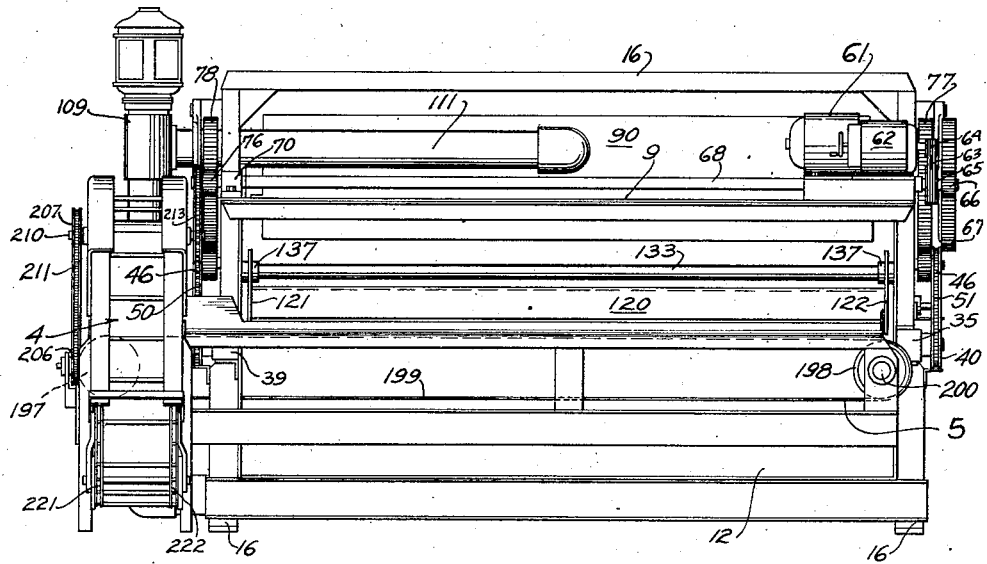
FIG_3_
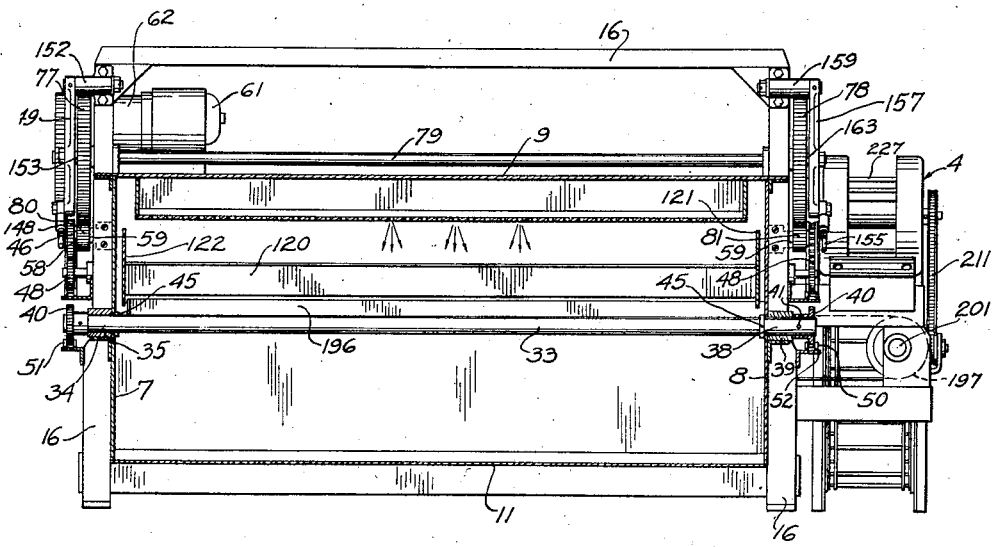
FIG_7_
INVENTOR
ALBERT R. THOMPSON
BY
Philip G. Minnis
ATTORNEY Nov. 30, 1943.   A. R. THOMPSON   2,335,618
CAN HANDLING APPARATUS
Filed April 6, 1940   5 Sheets-Sheet 3
FIG_4_
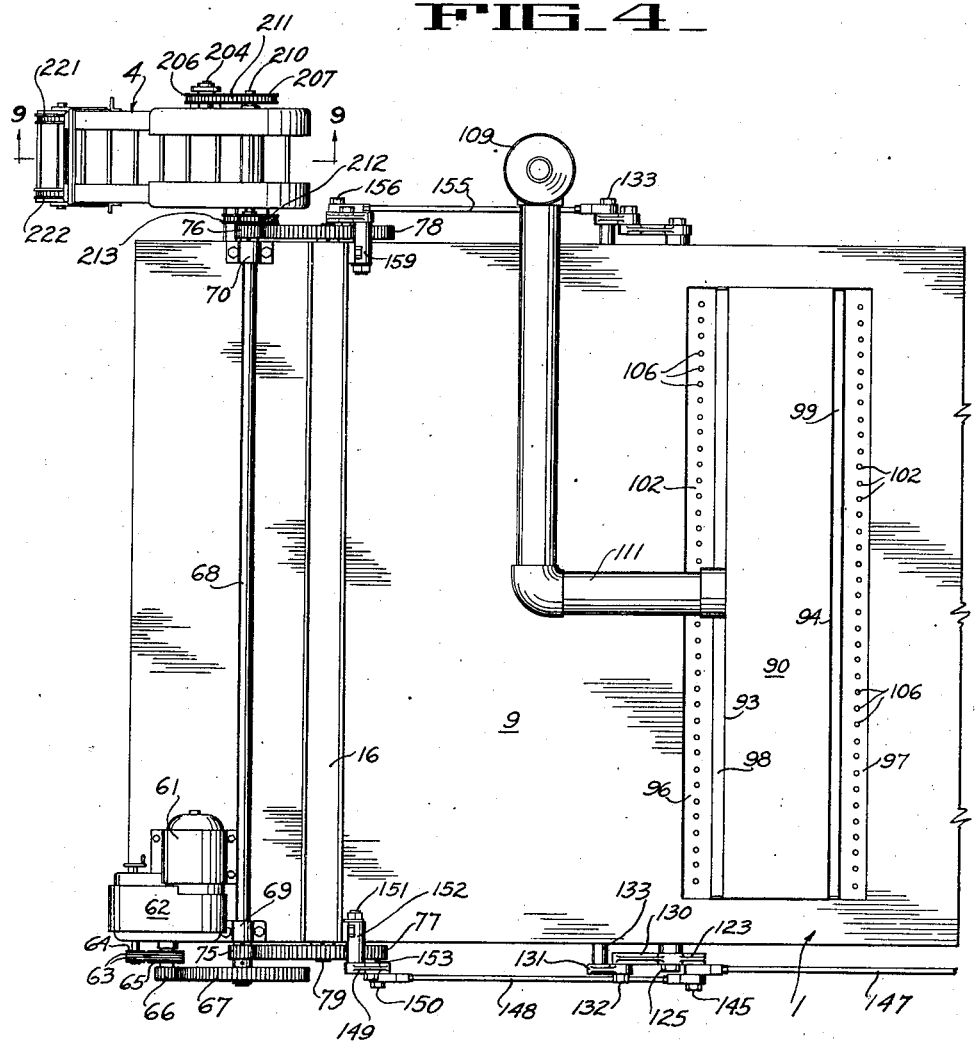
INVENTOR
ALBERT R. THOMPSON
BY Philip A. Minnis
ATTORNEY

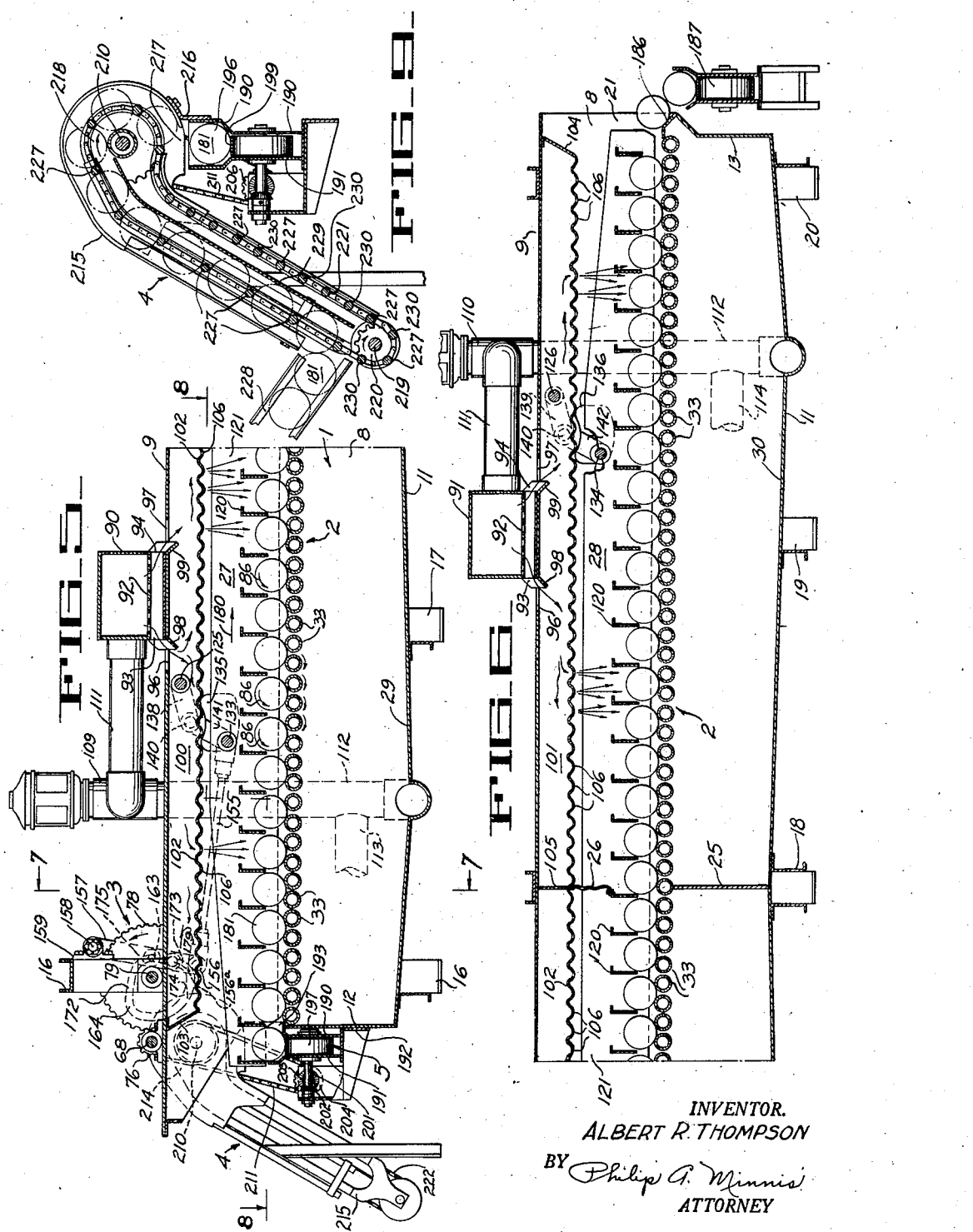

Nov. 30, 1943.　　A. R. THOMPSON　　2,335,618
CAN HANDLING APPARATUS
Filed April 6, 1940　　5 Sheets-Sheet 5
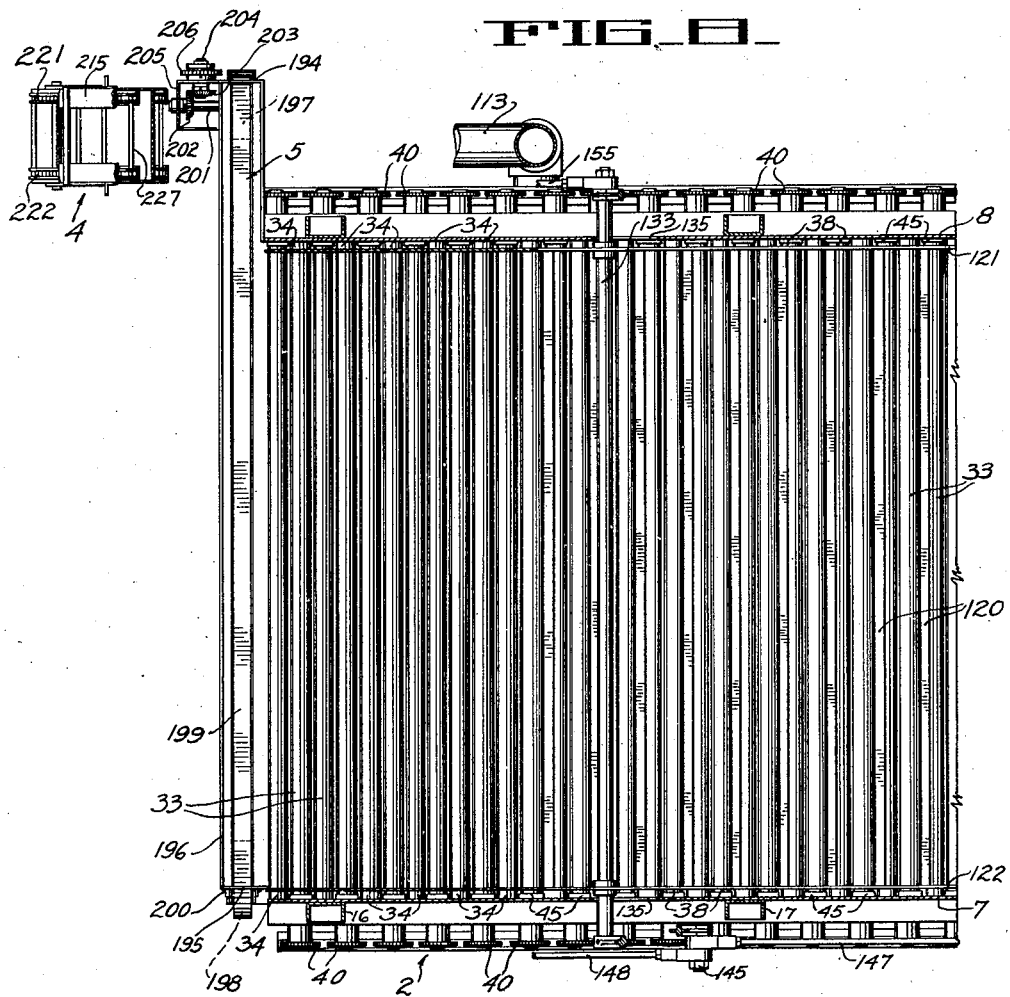
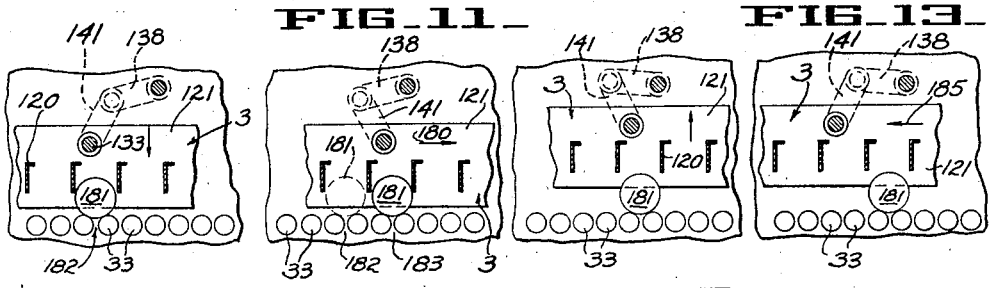
INVENTOR
ALBERT R. THOMPSON
BY Philip A. Minnis
ATTORNEY Patented Nov. 30, 1943

2,335,618

UNITED STATES PATENT OFFICE 2,335,618

CAN HANDLING APPARATUS

Albert R. Thompson, Los Gatos, Calif., assignor to Food Machinery Corporation, San Jose, Calif., a corporation of Delaware Application April 6, 1940, Serial No. 328,326

3 Claims. (Cl. 198—31)

The present invention appertains to apparatus for treating canned goods by application of a treating medium exterior of the same.

More specifically, the present invention relates to a transverse roll cooker for sterilizing canned goods by subjecting the same to cooking temperatures during rotation of the cans and agitation of the contents thereof.

One of the objects of the present invention is to provide a transverse roll cooker which includes means for controlling the treating period of the canned products and the agitation thereof during the treating process.

Another object of the present invention is to provide a cooking apparatus which comprises a treating compartment which may be preferably divided into a cooking and a cooling section and wherein all operating mechanism for controlling the treating period and agitation of the canned goods is arranged exterior of such treating compartment and not subjected to the corrosive effects of the treating medium employed in connection therewith.

Another object of the present invention is to provide a transverse roll cooker adapted for the treatment of cans of various size without subjecting the cans to shocks which would cause damage to the contents thereof.

A further object of the present invention is to provide a canned goods cooker of simple, efficient, and inexpensive construction which is economical in operation and maintenance.

Other and further objects and advantages of the present invention will become apparent from the following description and drawings, in which:

Figs. 1 and 2 constitute a side view of the transverse roll cooker of the present invention, Fig. 2 being a continuation of Fig. 1.

Fig. 3 illustrates a front view of the transverse roll cooker looking in the direction of line 3—3 in Fig. 1.

Fig. 4 is a plan view of the portion of the machine shown in Fig. 1.

Figs. 5 and 6 illustrate a longitudinal section through the entire machine of the present invention, Fig. 6 representing the continuation of Fig. 5.

Fig. 7 is a transverse section of Fig. 5, the view being taken along line 7—7 of Fig. 5.

Fig. 8 is a horizontal sectional view taken along the line 8—8 in Fig. 5.

Fig. 9 shows a longitudinal section of the feed conveyor of the present invention, the view being taken along the line 9—9 of Fig. 4.

Figs. 10 to 13 inclusive are diagrammatic views illustrating the mode of operation of the can advancing mechanism.

The apparatus of the present invention consists generally of a treating compartment 1 wherein the cans are subjected to the action of a treating medium; a can supporting mechanism 2 for supporting the cans and for agitating the contents thereof during the treating period; a can shifting mechanism 3 for advancing the cans through the treating compartment; and a feed elevator 4 and transverse conveyor 5 for supplying the cans to the treating compartment of the machine.

Referring first to the treating compartment 1 of the apparatus of the present invention and primarily to Figs. 1, 2, 5, and 6, it will be noted that the same consists of the side walls 7 and 8, a top wall 9, a bottom wall 11, and end walls 12 and 13. The treating compartment is supported by frame members 16 to 20 inclusive in any convenient manner. The end walls 12 and 13 extend at right angles to the bottom wall 11 and partially close the treating compartment 1 so as to permit the installation of the transverse conveyor 5, to provide sufficient space for the discharge of the cans from the machine at the discharge end 21 thereof, and to provide sufficient clearance for the can advancing mechanism 3 previously referred to.

The treating compartment 1 of the apparatus of the present invention may be preferably provided with a central partition 25 and a flexible partition 26 for dividing the same into a cooking section 27 and a cooling section 28. The bottom wall 11 may be preferably inclined at portions within the cooking and cooling sections to form trough portions 29 and 30 for collecting the treating medium of each section separately, so that the same may be used again in the continuous operation of the machine.

If desired, however, the central partition 25 and the flexible partition 26 may be omitted and the entire treating compartment 1 may be utilized either for cooking or cooling purposes of the canned goods, as will be apparent to those versed in the art.

Mounted within the treating compartment 1 intermediate the bottom and top walls thereof are a plurality of parallel closely spaced, smooth surfaced rolls 33 extending transversely of the machine. These rolls form a horizontal treating bed which extends longitudinally of the machine for supporting the cans to be treated.

In accordance with the teachings of the present invention, the cans are advanced from the feed end toward the discharge end of the machine transversely across the rolls above referred to. The rolls 33 are of comparatively small diameter with respect to the can size and, depending upon the size of the cans to be handled, the same may be either positioned in alternate or successive valleys formed between the transverse rolls.

As previously mentioned, the rolls 33 extend transversely of the treating compartment of the machine and may be of considerable length so as to accommodate a row of cans (preferably about 10 cans) in each valley therebetween.

The end portions 34 of successive rolls 33 are mounted within bearings 35 of the side walls 7 and 8, respectively, while the other ends 38 of successive rolls 33 extend through bearings 39 of the side walls 7 and 8, respectively.

Mounted upon the ends 38 of the rolls 33 are sprocket wheels 40 which are fixed to the rolls for rotation therewith by means of pins 41. Retaining washers 45 secured to the rolls 33 adjacent the side walls 7 and 8, respectively, and cooperating with the bearings 39 are provided to prevent transverse movement of the rolls 33 and to hold them securely in place within the bearings 35 and 39. The sprocket wheels 40 of adjacent transverse rolls are arranged exterior of the treating compartment 1 and on opposite sides thereof, so that sufficient space for mounting of the sprocket wheels 40 of the rolls is provided on one or the other side of the machine, and the same will not interfere with each other, as will be clearly seen from Figs. 1, 2, and 8. Trained around the sprocket wheels 40, drive sprockets 46, and a plurality of idler sprockets 48 and 49, are endless sprocket chains 50 and 51. Each of the idler sprockets 48 at opposite sides of the treating compartment 1 is adjustably mounted on the side walls 7 and 8, respectively, by means of a bracket 52, slot 53, and cap screw 54. These idler sprockets 48 may be adjusted in such a manner as to take up any slack in the sprocket chains 50 and 51 or to release the tension thereof to permit removal of the drive sprockets 46.

The drive sprockets 46 are removably mounted on stud shafts 58 rotatably positioned within socket bearings 59. If it is desired to obtain a different speed of travel of the endless chains 50 and 51, the sprocket wheels 46 may be replaced by larger or smaller drive sprockets.

The shafts 58 and sprockets 46 are driven by an electric motor 61 positioned upon the top wall of the treating compartment. The motor 61 is operatively connected through a gear reduction mechanism 62, belts 63, pulleys 64, 65 to a gear 66 which is in engagement with a gear 67 fixed to a shaft 68 supported within bearings 69 and 70 upon the top wall 9 of the machine. Keyed to the shaft 68 are drive pinions 75 and 76 which cooperate with cam gears 77 and 78, respectively. The cam gears 77 and 78 are rotatably mounted by means of a shaft 79 within the upper portion of the frame 16 and cooperate with intermediate gears 80 and 81, respectively, mounted upon the stud shafts 58 to which the drive sprockets 46 previously referred to are secured for rotation therewith.

From the above it will therefore be seen that upon operation of the motor 61 the drive gears 46 are rotated to effect travel of the endless chains 50 and 51 past the sprockets 40 of the rollers 33 and around the idler sprockets 48 and 49. Upon rotation of the gears 77 and 78 in a direction as indicated by an arrow in Fig. 1, the endless chains 50 and 51 will travel in the direction of the arrow 82 in Figs. 1 and 2. The sprockets 40 will therefore be rotated, causing a corresponding rotation of the rollers 33 in the direction of the arrows as shown in Fig. 5.

The cans positioned within the valleys between adjacent pairs of transverse rolls will be rotated in the direction of the arrows 86, as shown in Fig. 5, and the contents thereof will be agitated to increase the heat transmission throughout the same. Obviously, by varying the speed of rotation of the drive sprockets 46 by means of the gear reduction mechanism 62, the speed of rotation of the cans may be varied, and likewise, by replacing the drive sprockets 46 with sprockets of a smaller or larger size, different speeds of rotation of the transverse rolls and consequently a variation of the agitation of the contents of the cans may be obtained.

Mounted upon the top wall of the treating compartment 1 are transversely extending conduits 90 and 91 provided with a perforated partition 92 and discharge openings 93 and 94. The top wall 9 adjacent the discharge openings 93 and 94 of the transverse conduits 90 and 91 comprises inlet openings 96 and 97 and deflecting chutes 98 and 99. The outlet openings 93 and 94 and inlet openings 96 and 97 establish communication between the transverse conduits 90 and 91 and treating medium distributing compartments 100 and 101 respectively.

The treating medium distributing compartments 100 and 101 are arranged within the upper portion of the treating compartment 1 and are formed by a corrugated sheet metal partition 102 which extends longitudinally and transversely of the treating compartment 1 to which it is secured at the side walls 7 and 8 thereof. The partition 102 is provided with end portions 103 and 104 and a central partition 105, which extend upwardly toward the top wall 9 to which they are secured in any convenient manner. The corrugated partition 102 is perforated over its entire length, as shown at 106, for discharging the treating medium from the compartments 100 and 101 into the cooking section 27 and cooling section 28 of the treatment compartment 1 and upon the cans travelling therethrough.

The treating medium may be preferably supplied to the transverse conduits 90 and 91 by means of pumps 109 and 110 provided with discharge conduits 111 and suction pipes 112. The suction pipes 112 extend into the cooking and cooling compartments 27 and 28, respectively, for returning the treating medium collecting therein to the treating medium distributing compartments 100 and 101 for re-use.

The inlet conduits 112 of the pumps 109 and 110 may be further connected to supply conduits 113 and 114, respectively, which lead to different sources of treating medium supply. Preferably, the supply pipe 113 may be connected to a hot water supply tank while the supply pipe 114 may be preferably connected with a source of cold water supply. Valves may be provided in conjunction with the conduits 113, and 114 for regulating the admission of the treating medium.

From the above it will therefore be seen that treating medium discharged by the pumps 109 and 110 into the transverse conduits 90 and 91 is directed into the treating medium distributing compartments 100 and 101 in a manner as indicated by arrows in Figs. 5 and 6. The treating medium is distributed over the entire area of the partition 102 and discharged therefrom through the perforations 106 by gravity fall upon the canned goods passing through the treating compartment 1.

As already previously mentioned, the entire treating compartment 1 may be utilized for cooking purposes and in such case cooking medium may be supplied to the treating medium compartments 100 and 101. In such instance, the apparatus of the present invention will function as a cooker and the canned goods are discharged from the same after sterilization thereof and transferred to a separate cooling apparatus of similar construction positioned adjacent the cooking apparatus. Likewise, if it is desired to utilize the apparatus of the present invention for cooling purposes, it is only necessary to supply a cooling medium to the distributing compartments 100 and 101. From the above it will therefore be obvious that the apparatus of the present invention is adaptable for cooking and cooling treatment of canned goods in any desired manner, as outlined above, and as will be apparent to those versed in the art.

Mounted above the transverse rolls 33 within the treating compartment 1 are a plurality of transversely extending pusher bars 120. These pusher bars are supported by pusher bar supporting members 121 and 122 extending longitudinally of the treating compartment 1 above the transverse rollers 33 and adjacent the side walls 7 and 8. These supporting members are suspended within the treating compartment 1 by the pusher bar actuating mechanism, which will be described hereinafter, in spaced relationship with respect to the transverse rolls 33 and in such a manner that during actuation of these supporting members 121 and 122 the same will not contact the transverse rolls 33. The transverse pusher bars are likewise spaced from the transverse rolls 33 and are positioned in such a manner relative to the same that during their operation they will effect a shifting of the cans through the treating compartment from the feeding end to the discharge end thereof. The spacing of the pusher bars 120 with respect to each other is such as to accommodate certain sizes of cans for which the machine is designed. The stroke of the pusher bar actuating mechanism determines the amount of forward shift of the cans.

The pusher bars 120 and supporting members 121 and 122 are suspended within the treating compartment 1 by means of bell crank levers 123 and 124 on the front side of the machine, as will be clearly seen from Figs. 1 and 2. The bell crank levers 123 and 124 are pivotally mounted by means of transverse shafts 125 and 126 supported within bearings 127 and 128 respectively, positioned exterior of the treating compartment 1 and attached to the lower surface of the top wall 9, which extends slightly beyond the side wall 7. Each of the bell crank levers 123 and 124 includes a short lever arm 130 which is pivotally secured to a link 131 by means of a pivot pin 132. The links 131 are pivotally attached to transverse shafts 133 and 134 which extend transversely of the machine through openings 135 and 136 in the side walls 7 and 8 of the treating compartment. The transverse shafts 133 and 134 extend through bushings 137 of the supporting members 121 and 122, as will be clearly seen from Fig. 3.

Pivotally mounted on the transverse shafts 125 and 126 at the rear side of the machine are links 138 and 139 pivotally connected at 140 to links 141 and 142, which are in turn pivotally secured to the transverse shafts 133 and 134, respectively.

The bell crank levers 123 and 124 are pivotally interconnected by means of pivot pins 145 and 146 to an actuating rod 147 so that operation of the bell crank lever 123 is transferred to the bell crank lever 124. The bell crank lever 123 is further pivotally connected by means of the pivot pin 145 to an actuating rod 148 pivoted to an actuating arm 149 by means of a pivot pin 150. The actuating arm 149 is pivotally suspended on the upper portion of the frame member 16 of the machine by means of a pivot pin 151 and pivot pin bearing 152. The actuating arm 149 is further provided with a roller 153 (see Figs. 4 and 7), which engages a camway 154 of the cam gear 77.

The transverse shaft 133 adjacent the link 141 on the rear side of the machine is provided with an actuating rod 155 which is pivotally connected to the transverse shaft 133 at one end thereof while the other end of the actuating rod 155 is pivotally connected by means of a pivot pin 156 to an actuating arm 157. This arm 157 is pivotally suspended on the frame 16 of the machine by means of a pivot pin 158 and bearing 159. The actuating arm 157 carries a roller 163 engaging a camway 164 of the cam gear 78. The cams 154 and 164 are of a configuration as shown in Figs. 1 and 5 and are so positioned with respect to each other that upon rotation of the gears 77 and 78 an alternate operation of the actuating rods 148 and 155 is obtained. The actuation of the bell crank levers 123 and 124 by means of the actuating rods 147 and 148 during rotation of the cam 154 and oscillation of the actuating arm 149 causes raising and lowering of the supporting members 121, 122, and pusher bars 120, while the operation of the link mechanism 138, 144, the actuating rod 155, actuating arm 157, and cam 164 effect a forward and backward movement of the supporting members 121, 122 and pusher bars 120.

The openings 135 and 136 in the side walls 7 and 8 of the machine are of a configuration corresponding to the path of movement of the transverse shafts 133 and 134.

The camway 154 of the cam gear 77 comprises radially extending portions 168 and 169 and circular portions 170 and 171, and camway 164 which is similar to camway 154 comprises likewise radially extending portions 172 and 173 and circular cam portions 174 and 175.

When the can advancing mechanism is in a position as shown in Figs. 1 and 5 the transverse shafts 133, 134, pusher bars 120, and supporting members 121 and 122 are in their lowermost position, as shown in Fig. 10, and rotation of the cam gear 78 by means of the motor 62 in a direction of the arrow as shown in Fig. 1 will cause travel of the circular camway portion 170 along the roller 153 without effecting the movement of the actuating arm 149. The bell crank levers 123 and 124 will therefore remain in a position as shown in Figs. 1 and 2 during the travel of the roller 153 along the circular cam portion 170.

Upon operation of the cam gear 77, cam gear 78 is rotated simultaneously therewith, and the rotation of this cam gear 78 in the direction of the arrow as shown in Fig. 5 will effect the travel of the radial camway portion 173 with respect to the roller 163 of the actuating arm 157. The arm 157 will therefore move in the direction of the arrow 179 around pivot pin 158. The transverse shaft 133, pusher bars 120, and longitudinal supporting members 121, 122 will be shifted in the direction of arrow 180 as shown in Figs. 5 and 11.

The links 141 and 142 pivot during such movement on pivot pins 140 and a forward shifting of the cans 181 supported upon the transverse rollers 33 will be effected. The cans 181 which are positioned with their longitudinal axes parallel to the axis of the transverse rollers 33 are thereby advanced from the valley 182 to the valley 183 between adjacent pairs of rollers 33, as diagrammatically illustrated in Fig. 11. In other words, the cans 181, as will be clearly seen from Fig. 11, are advanced over two valleys, formed by adjacent pairs of rollers 33, during the forward movement of the transverse shafts 133 and 134. When this forward movement is completed the links 138, 139 and 141, 142 are in the position as shown in Fig. 11, and the roller 163 enters the circular camway portion 174. While the circular camway portion 174 passes the roller 163 no further forward movement of the transverse shafts 133 and 134 is effected. However, during the continuing rotation of the cam gear 77, the radial camway portion 168 travels past the roller 153 and effects a backward movement of the actuating arm 149 in the direction of the arrow 184, as clearly seen in Fig. 1. The actuating rods 147 and 148 perform a similar backward movement, and bell crank levers 123 and 124 will pivot around their pivot pins 125 and 126, effecting a raising of the transverse shafts 133 and 134, pusher bars 120 and supporting members 121 and 122 to a position as shown in Fig. 12. The transverse pusher bars 120 are thereby raised above the cans 181 positioned upon the treating bed of the machine and are thereby moved out of contact with the same. When the transverse shafts 133 and 134 reach their uppermost position the circular camway portion 171 passes the roller 153, and while the roller 153 travels along the portion 171 the actuating arm 149 remains stationary, holding the transverse shafts 133 and 134 and the pusher bars 120 in their raised positions.

During the travel of the circular camway portion 171 past the roller 153, the radial camway portion 172 of the cam gear 78 passes roller 163 and effects the return of the actuating arm 157 to the position as shown in Fig. 5, while the transverse shafts 133 and 134 and the pusher bars 120 remain in their uppermost position. The transverse shafts 133 and 134 are thereby pulled backward in the direction of the arrow 185 (see Fig. 13), and upon the end of said backward movement the shafts 133 and 134 will have assumed a position as diagrammatically shown in Fig. 13.

During the continued rotation of the cam gears 77 and 78 the actuating arm 157 remains now in its position as shown in Fig. 5 while the circular camway portion 175 travels past roller 163. At the same time the camway portion 169 of the cam gear 77 travels past roller 153 and effects a forward movement of the actuating arm 149 to the position as shown in full lines in Fig. 1. The bell crank levers 123 and 124 are thereby rocked around their pivot pins 125 and 126 to their original positions as shown in Figs. 1 and 2 and the transverse shafts 133 and 134, as well as the pusher members 120 and supporting members 121 and 122 are lowered to their original position as shown in Figs. 5, 6, and 10. The pusher members 120 enter again into the spaces between the cans 181 and are now in a position to engage the cans 181 and to cause further advancement thereof during the next cycle of operation, which is repeated in the same manner as described above.

In this way the cans 181 are advanced from the feed end toward the discharge end of the machine and are discharged therefrom by means of a discharge chute 186 upon a transverse conveyor 187 or any other conveyor structure.

While the cans travel through the treating compartment 1 in a manner hereinbefore described, they are continuously rotated around their longitudinal axes so as to cause agitation of the contents thereof and to effect an even treatment of the complete contents of the cans. In this way, the cans pass first through the cooking section 27 wherein a heating medium is discharged by gravity fall upon the same for the heating medium distributing section 100 through the perforations 106, and the contents of the cans are sterilized and cooked. Thereupon the cans travel through the cooling section 28 wherein they are subjected to the action of the cooling medium discharged through the perforations 106 of the cooling medium distributing section 101 and the temperature of the contents of the cans is thereby lowered to any desired degree. The completely treated products are discharged from the machine as hereinbefore referred to.

As previously mentioned, the drive sprockets 46 may be replaced with larger or smaller sprockets to thereby vary the speed of rotation of the rolls and the amount of agitation of the canned goods while the same pass the treating compartment 1. The speed of advancement of the cans through the machine may be varied by means of the speed reduction mechanism 62 previously referred to.

Referring now more specifically to the feed mechanism of the apparatus of the present invention, it will be noted that the same comprises the feed elevator 4 and transverse conveyor 5 previously mentioned. The conveyor 5 extends transversely of the charge end of the machine parallel to the first roll thereof. This conveyor comprises side walls 190 and 191 supported by brackets 192. The side wall 190 adjacent the first transverse roll 33 is formed into a charge chute 193, as will be best seen from Fig. 1. These side walls 190 and 191 form in conjunction with end walls 194 and 195 a conveyor compartment generally designated 196.

Mounted intermediate the side walls 190 and 191 are conveyor belt pulleys 197 and 198 around which a conveyor belt 199 is trained. The upper run of the conveyor belt is positioned slightly below the charge chute portion 193 of the side wall 190, so that cans supported thereby will be held in proper position within the conveyor compartment 196.

The conveyor belt pulley 198 is an idler pulley rotatably supported by means of a shaft 200 mounted within the side walls 190 and 191 near the front side of the machine as shown in Figs. 3 and 8. The conveyor belt pulley 197, mounted between the side walls 190 and 191 of the conveyor compartment 196 at the rear side of the machine, is fixed upon a shaft 201 provided with a bevel gear 202 which is in operative engagement with bevel gear 203 keyed to the shaft 204 supported within a frame structure 205 mounted upon one of the brackets 192 previously referred to.

Keyed to the shaft 204 is a sprocket gear 206 and trained around the same and another sprocket gear 207 mounted on a drive shaft 210 of the feed elevator 4 is an endless sprocket chain 211. The shaft 68 previously referred to is provided with a sprocket gear 212 which is keyed thereto. A sprocket chain 213 is trained around this sprocket gear 212, and a sprocket gear 214 is adapted to operate the conveyor drive shaft 210 and the shaft 204 of the transverse conveyor upon operation of the motor 62.

The feed elevator 4, a detail view of which is shown in Fig. 9, comprises a housing structure 215 secured to the side wall 190 of the transverse conveyor by means of a flange 216. The elevator housing 215 is provided with a discharge opening 217 above the transverse conveyor 5 for discharging the cans from the elevator upon the upper run of the conveyor belt 199 previously described.

The drive shaft 210 of the conveyor 5 carries sprockets 218 rotatably mounted within bearing portions of the housing 215, and positioned within the lower end of the conveyor housing 215 is a shaft 219 provided with idler sprockets 220.

Trained around the drive sprockets 218 and idler sprockets 220 are conveyor chains 221 and 222 which are interconnected with respect to each other by means of transverse bars 227. These bars are spaced in such a manner with respect to each other that cans delivered to the elevator 4 by means of a can assembly chute 228 are permitted to enter one at a time between the transverse bars 227 and upon rotation of the sprockets 218 and 220 in the direction as indicated by arrows in Fig. 9 the cans 181 supplied to the elevator 4 are moved in an upward direction and ride along the elevator table 229, as shown in Fig. 9.

In this way the cans supplied by the chute 228 are elevated and discharged through the discharge opening 217 into the transverse conveyor compartment 196 and are placed upon the upper run of the conveyor belt 199, which advances the cans with their longitudinal axes parallel to the rolls transversely of the machine. The first can so delivered to the transverse conveyor 5 will travel in a transverse direction until it abuts against the end wall 195, which will hold this can in a position adjacent said end wall. Additional cans supplied to the conveyor 5 will likewise travel in a transverse direction of the machine and abut against the preceding can, so that a row of cans extending transversely of the machine at the charge end thereof may be assembled adjacent the treating bed of the machine.

The transverse width of the apparatus of the present invention, as illustrated in Fig. 9, is such that a row of ten cans may be assembled within the transverse conveyor 5 adjacent the charge end of the machine before the can advancing mechanism, which extends over the conveyor compartment 196, is operated to effect the shifting of the assembled cans into the treating compartment for advancing the same therethrough in a manner as already specifically referred to hereinbefore.

After a predetermined number of cans have been placed into the transverse conveyor by means of the feed elevator 4, no further supply of cans into the transverse conveyor is desired until the cans have been discharged from the same. For this reason, the cross bars 227 of the elevator chains 221 and 222 are positioned in such a manner as to provide ten successive receiving pockets between the chains while the remaining spaces between the chain bars 227 are blocked out by additional transverse bars 230.

In this way, only a predetermined number of cans may be successively elevated and discharged into the transverse conveyor compartment 196, while during the time the advancement of the cans from the conveyor compartment into the treating compartment is effected no cans are delivered to the transverse conveyor 5. After completion of the advancement of the assembled cans from the conveyor 5 to the treating compartment 1, another set of cans will be delivered to the transverse conveyor by the feed elevator in a manner as will be obvious to those skilled in the art.

From the above description of the construction and operation of the apparatus of the present invention it will therefore be seen that the cans delivered to the feed elevator 4 by means of the can assembly chute 228 are elevated and discharged into the transverse conveyor 5, the conveyor belt of which functions to assemble the cans in a row adjacent the charge end of the machine. Thereupon, the operation of the can advancing mechanism effects the travel of the cans from the conveyor compartment 196 into the treating compartment 1 and upon the treating bed formed by the transverse rolls 33 therein. The cans so delivered to the treating compartment 1 are first placed within the valley formed between the first pair of transverse rolls and are thereafter shifted over the treating bed of the machine, always advancing two valleys at a time.

During the return stroke of the advancing mechanism the cans remain at rest within a valley between the rolls for a predetermined period and are rotated by the can agitating mechanism previously referred to.

During their advancement through the treating compartment the cans are always under control of the pusher bars 120, which effect their forward shifting over the rolls and control their gradual admission into the valleys between the rolls, so that the transmission of shocks which would damage the contents of the cans is avoided.

The machine of the present invention may be adapted for handling cans of smaller size than those illustrated in the accompanying drawings by providing additional pusher bars 120 not shown herein. For this purpose, the longitudinal supporting members 121 and 122 may be provided with slots for removably receiving such additional pusher bars, so as to render the machine of the present invention adaptable for various sizes of cans, and in such case the additional pusher bars may be replaced or removed in accordance with the requirements of practice. If the additional pusher bars are employed and the cans are to be advanced only one valley at a time, the stroke of the actuating mechanism must be reduced. This is accomplished by connecting the actuating rod 155 at 156a to the actuating arm 157.

While I have shown and described a preferred embodiment of the present invention, it is to be understood that I do not wish to be limited to the specific construction described herein, as the same may be changed in accordance with the scope of the claims appended hereto.

Having thus described my invention and in what manner the same may be used, what I claim as new and desire to protect by Letters Patent is:

1. A can handling apparatus comprising a bed of parallel rolls forming a can path over which cans may pass in step-by-step movement from valley to valley transversely across the rolls, a cross conveyor extending across the feed end of said can path, a feed conveyor transverse to said cross conveyor for feeding cans to the latter in end-to-end relation, said feed conveyor having a predetermined number of open and closed pockets whereby a predetermined number of cans will be fed to said cross conveyor, and means cooperating with said bed of rolls and cross conveyor for transferring the cans sidewise from the cross conveyor upon said bed of rolls and for advancing the cans transversely over the same.

2. Apparatus for handling canned goods comprising closely spaced parallel can supporting rolls of a diameter substantially one half of the diameter of the cans supported thereby in the valleys formed therebetween, can shifting means above said rolls including rigid bars parallel to said rolls and closely embracing the cans, means for operating said can shifting means to intermittently shift the cans sidewise transversely across two rolls at each cycle of said can shifting means, the bars of said can shifting means being so spaced and positioned relative to the cans and said rolls as to control the descent of the cans into the valleys between the rolls to prevent shock to the cans.

3. A can handling apparatus comprising a bed of parallel rolls forming a can path over which cans may pass in step by step movement from valley to valley transversely across the rolls, a cross conveyor extending across the feed end of said can path, a feed conveyor for feeding cans to the latter in end to end relation, said feed conveyor having a predetermined number of open and closed pockets whereby a predetermined number of cans will be fed to said cross conveyor, and means cooperating with said bed of rolls and cross conveyor for transferring the cans sidewise from the cross conveyor upon said bed of rolls and for advancing the cans transversely over the same.

ALBERT R. THOMPSON.